UNITED STATES PATENT OFFICE.

CARL HEIDENREICH, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

DISAZO DYE.

944,328.   Specification of Letters Patent.   Patented Dec. 28, 1909.

No Drawing.   Application filed July 28, 1909.   Serial No. 510,127.

*To all whom it may concern:*

Be it known that I, CARL HEIDENREICH, doctor of philosophy, chemist, citizen of the German Empire, residing at Vohwinkel, near Elberfeld, Germany, have invented new and useful Improvements in Disazo Dye, of which the following is a specification.

My invention relates to the manufacture and production of new disazo coloring matters dyeing wool from acid baths black shades which are distinguished by their excellent fastness to light.

The new dyestuffs are obtained by combining in acid solution an ortho-aminobenzene-sulfonic acid compound of the formula:

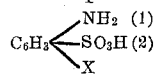

(X meaning hydrogen or a substituent such as Cl, $NO_2$, $CH_3$ or the like) with 1-amino-8-naphthol-3.6-disulfonic acid and then combining in alkaline solution any diazo compound with the monoazo dyestuff thus produced.

The new dyestuffs are dark powders which are soluble in water with a blue to bluish-green color, and which are soluble in concentrated sulfuric acid with a bluish-green color. They yield upon reduction with stannous chlorid and hydrochloric acid an amin, an amino-benzene derivative of the above given formula and 1.2.7-triamino-8-naphthol-3.6-disulfonic acid. They dye wool from acid baths black shades distinguished by their excellent fastness to light.

*Example.*—23.4 parts of para-nitranilin-ortho-sulfonic acid (ammonium salt) are diazotized with 35 parts of hydrochloric acid and 6.9 parts of sodium nitrite. 34.1 parts of 1.8-aminonaphthol-3.6-disulfonic acid (acid sodium salt) are then dissolved in 350 parts of hot water and the necessary quantity of sodium carbonate. The solution thus obtained is cooled to 10° C. and rendered weakly acid (reaction on congo paper) with hydrochloric acid. To the mixture thus obtained the diazo compound of para-nitranilin-ortho-sulfonic acid is added while stirring; stirring is continued for about 12 hours, the free mineral acid being neutralized during this time with acetate of sodium. Diazobenzene obtained from 9.3 parts of anilin and then 700 parts of a 16 per cent. sodium carbonate solution are added to the reaction mass. After some hours the mixture is heated to 60° C., the dye is precipitated with common salt, filtered off and dried. It is in the shape of its sodium salt a dark powder soluble in water with a blue and in concentrated sulfuric acid with a greenish-blue color. By reduction with stannous chlorid and hydrochloric acid anilin, para-phenylenediamin-sulfonic acid and 1.2.7-triamino-8-naphthol-3.6-disulfonic acid are obtained. It dyes wool from acid baths greenish-black shades fast to light.

The process is carried out in an analogous manner on using instead of anilin other diazo compounds or instead of para-nitranilin-sulfonic acid other of the above mentioned compounds, *e. g.* ortho-sulfanilic acid, para-cholro-anilin-ortho-sulfonic acid, para-toluidin-meta-sulfonic acid, or the like.

I claim:—

1. The herein described new azo dyestuffs, obtainable from an amin, an ortho-amino-benzene-sulfonic-acid compound of the above given formula and 1.8-aminonaphthol-3.6-disulfonic acid, which dyestuffs are, after being dried and pulverized, in the shape of their alkaline salts dark powders soluble in water with a blue to bluish-green color; yielding upon reduction with stannous chlorid and hydrochloric acid an amin, an ortho-aminobenzene-sulfonic acid of the above given formula and 1.2.7-triamino-8-naphthol-3.6-disulfonic acid; dyeing wool black shades fast to light, substantially as described.

2. The herein described new disazo dyestuff obtainable from para-nitranilin-ortho-sulfonic acid, anilin and 1.8-aminonaphthol-3.6-disulfonic acid, which dye is, after being dried and pulverized in the shape of its sodium salt a dark powder soluble in water with a blue color and soluble in concentrated sulfuric acid with a greenish-blue color; yielding upon reduction with stannous chlorid and hydrochloric acid para-phenylenediamin-sulfonic acid, anilin and 1.2.7-triamino-8-naphthol-3.6-disulfonic acid; and dyeing wool greenish-black shades fast to light, substantially as described.

In testimony whereof I have hereunto set my hand in the presence of two subscribing witnesses.

CARL HEIDENREICH. [L. S.]

Witnesses:
 OTTO KÖNIG,
 WILLY KLEIN.

It is hereby certified that in Letters Patent No. 944,328, granted December 28, 1909, upon the application of Carl Heidenreich, of Vohwinkel, near Elberfeld, Germany, for an improvement in "Disazo Dyes," errors appear in the printed specification requiring correction as follows: Page 1, lines 16–18, the formula $C_6H_3\!\!<\!\!{}^{NH_2\ (1)}_{O_3H\ (2)}$ should read $C_6H_3\!\!<\!\!{}^{NH_2\ (1)}_{SO_3H\ (2)}\!\!\!{}_X$, and same page, line 72, the word "cholro" should read *chloro;* and that the said Letters Patent should be read with these corrections therein that the same may conform to the record of the case in the Patent Office.

Signed and sealed this 8th day of March, A. D., 1910.

[SEAL.]

C. C. BILLINGS,
*Acting Commissioner of Patents.*